3,340,214
EASILY PROCESSED COMPOSITIONS COMPRISING CIS 1,4-POLYBUTADIENE, $C_6$–$C_{10}$ MONOCARBOXYLIC ACID AND ASPHALT
David Ivan Sapper, West Caldwell, N.J., assignor to Texas-U.S. Chemical Company, Parsippany, N.J., a corporation of Delaware
No Drawing. Filed Jan. 2, 1964, Ser. No. 335,416
7 Claims. (Cl. 260—23.7)

The present invention is directed to cis 1,4-polybutadiene rubber compositions having reduced resiliency for use in tires and tire treads.

Products prepared from cis 1,4-polybutadiene compositions are inherently resilient. Such characteristics in tire rubber compositions are undesirable. The resultant tire provides a noisy ride and poor traction on wet roads. Otherwise, cis 1,4-polybutadiene rubber compositions are tough and desirable for use in rubber tires.

It is an object of this invention to provide cis 1,4-polybutadiene compositions having lowered resiliency. It is also an object to provide pneumatic tires prepared from this improved cis 1,4-polybutadiene. A further object of the invention is to provide a process for lowering the resiliency of cis 1,4-polybutadiene.

I have discovered that cis 1,4-polybutadiene rubber compositions having lower resiliency are prepared by incorporating into the raw polymer stock (i) asphalt in an amount between 15 and 100 parts per hundred parts of rubber by weight (hereinafter referred to as phr.), and preferably between 20 and 100 phr.; and (ii) a monocarboxylic acid in an amount between 0.5 and 5 phr., and preferably between 1.5 and 3 phr. Low molecular weight aliphatic hydrocarbon polymers in an amount between 3 and 15 phr., and preferably between 5 and 10 phr. can be advantageously added for improved processing at intermittent mill temperature ranges between 120° and 200° F.

Although improved results are obtained utilizing as little as 15 phr. of asphalt, it is preferred to use an amount with the preferred range of 20 to 100 phr. When using asphalt in an amount in excess of the upper preferred range, the physical properties of the resultant composition are somewhat lessened, but still suitable for some industrial purposes. The useful asphalts are solid residues of petroleum refinery operations, such as a bottom residue of crude petroleum oil distillation, essentially hydrocarbon in nature, having wide molecular weight distribution, ranging from weights in excess of two million to weights of less than one thousand. Such asphalts are very hard materials below 0° C., and are readily pourable at 200° C. The asphalts suitable for use in this invention should have asphaltine contents below 18 percent. The asphaltine content is defined as the fraction of asphalt insoluble in n-pentane or 88° petroleum naphtha as determined by conventional methods. The flash point (Cleveland open cup method) should be above 500° F. The specific gravity is between 0.98 and 1.03.

The monocarboxylic acids useful in this invention are selected from the group consisting of straight chain aliphatic monocarboxylic acids having from 6 to 14 carbon atoms, branched chain aliphatic monocarboxylic acids having from 6 to 18 carbon atoms, cycloaliphatic monocarboxylic acids having from 5 to 18 carbon atoms, and aromatic monocarboxylic acids having from 6 to 18 carbons atoms. These include caproic acids, pelargonic acids, oleic acid, lauric acid, isocaproic acid, 4-ethylcapric acid, 6-butyldodecanoic acid; the naphthenic acids such cyclopentanecarboxylic acid, cyclopentylacetic acid, and camphonanic acid; p-butylbenzoic acid, p-allylbenzoic acid, p-dodecylbenzoic acid, o-, m-, and p-toluic acids, the chloro-, and nitro-benzoic acids, and the naphthoic acids. The preferred acids are benzoic acid, octanoic acid, and naphthenic acid.

The low molecular weight aliphatic hydrocarbon polymers useful in this invention should have molecular weights between 500 and 20,000. The term "aliphatic hydrocarbon polymer" defines polymers having an aliphatic hydrocarbon chain or "backbone," and includes copolymers of butadiene and styrene (up to 25% styrene); polyterpenes having ring and ball softening points between 10° C. and 125° C. and specific gravities between 0.95 and 1.00; polyethylenes having melting points between 200° F. and 235° F., specific gravity of approximately 0.92, and average viscosities at 140° C. of 100 to 4000 centipoises; and polybutenes having specific gravity at 60° F. of 0.87 to 0.91, flash points between 37° to 400° F., and pour points between 20 and 70° F. The polybutenes are preferred.

The cis 1,4-polybutadiene resins used as the base of the rubber compositions are highly stereoregular solution polymers manufactured by any of the numerous well known methods. At least 85% of the butadiene-1,3 units are joined cis-1,4. Cis 1,4-polybutadienes in the Mooney viscosity range of 20–150 are useful in the preparation of improved rubber compositions having final compound viscosities between about 45 and about 55. The improved compositions are prepared by standard techniques. The additives may be incorporated in the mix by conventional techniques, e.g. solid mixing in internal mills or open roll mills. The compositions containing the combination of the three additives specified hereinbefore have good processing characteristics over a wide mill processing range and are worked by the conventional methods without difficulty. These "mixes" have sufficiently good processing characteristics that they may be worked at low mill temperatures, e.g. 120° F.–165° F. The additives may also be added to the rubber cement after polymerization has been completed. The resultant mixture may then be steam stripped, washed and dried in the usual manufacturing system, producing a rubber crumb in an easily handled form. The mix may also contain other desired conventional compounding ingredients, including such materials as vulcanizing agents, accelerators, anti-ozonants and antioxidants, fillers, etc.

For the purpose of further explaining the invention to those skilled in the art, the following illustrative examples are given:

EXAMPLES 1–6

Cis 1,4-polybutadiene compositions were prepared according to the following formulation. 700 grams of the mixes noted in the table and containing the quantities of the asphalt, acid, and aliphatic hydrocarbon polymer shown were mixed in a Banbury mixer at 120° F. for 1 minute. The mixer was then stopped, the ram was raised; and a mixture of 350 grams of carbon black, 21 grams of zinc oxide, 7 grams of stearic acid, and 7 grams of N-phenyl-beta-naphthylamine was then added. The ram was lowered, cooling water was passed throughout the cooling section of the mixer, and mixing was continued for four minutes. Of the contents of the mixer, 465 grams were then transferred to a 6 x 13 rubber mill, where 15 grams of rosin acid, 3 grams of stearic acid, 2.7 grams of N-oxydiethylene benzothiazole-2-sulfenamide, and 6 grams of sulfur were added. The processing characteristics of the mixtures on the mill were semi-quantitatively rated. Stocks based on commercial styrene butadiene rubber (i.e. SBR–1500) were considered 100% mill processable for this rating scheme and were given an index of 100. Stocks of cis-polybutadiene containing 96–98% cis structure and having raw Mooney viscosities between 40–50 (i.e. "Phillips Cis–4") were considered 0% mill processable and were given an index rating of zero. The latter rating is based on the fact that such stocks do not adhere to mill rolls at temperatures greater than 120° F., and do not exhibit the excellent cohesion of SBR, but rather become "lacy"; that is there are numerous holes in the stocks during milling. For purposes of this rating scheme, 200° F. was selected as the operating mill temperature, since rubber compounds are ordinarily milled in a factory at or near this temperature following the original Banbury mixing.

*Mill rating index (SBR–1500 100)*

| | |
|---|---|
| Bands—no laciness | 100 |
| Bands—less than 5% lacy area | 90 |
| Bands—less than 10% lacy area | 80 |
| Bands—25% lacy area | 70 |
| Banding marginal—less than 10% lacy area | 70 |
| Bands—greater than 25% lacy area | 50 |
| Banding marginal—less than 25% lacy area | 50 |
| Banding marginal—greater than 25% lacy area | 25 |
| Does not band | 0 |

TABLE I

| Cis 1,4-polybutadiene | Control | 1 | 2 | 3 | 4 |
|---|---|---|---|---|---|
| Mooney 4, 31 | 100 | | | | |
| Mooney 4, 61 | | 100 | | | |
| Mooney 4, 65 | | | 100 | | |
| Mooney 4, 71 | | | | 100 | |
| Mooney 4, 112 | | | | | 100 |
| Asphalt | | 17 | 23 | 25 | 72 |
| Polybutene | | 4 | 7 | 10 | |
| Benzoic Acid | | 2.5 | 2.6 | 2.8 | 3.5 |
| Resultant Mooney 4' | 31 | 42 | 32 | 30 | 35 |
| Final Compound Mooney 4' | 56 | 45 | 53 | 54 | 48 |
| Mill Processability at 200° F | 0 | 70 | 90 | 90 | 90 |

In the Banbury mixing step of the compounding, the ingredients were incorporated into the control with great difficulty, while Samples 1, 2, 3, and 4 readily accepted the materials. Similar results were obtained when the curing agents were added on the mill. The control resisted addition of the materials, and uniform dispersion was extremely difficult to achieve. With Samples 1, 2, 3, and 4 addition and dispersion were accomplished without difficulty.

In order to demonstrate the improvement in resilience afforded by the invention, samples were prepared as above containing varying amounts of the asphalt, oil, and acid. The compounds were cured at 292° F. for 35 minutes and tested for rebound at room temperature and 300° F., according to the procedure described in ASTM D 1054–55. It was found that the ratio of percentage rebound at room temperature to percentage rebound at 300° F. is an excellent means for measuring the resiliency of a rubber and for estimating its quiet riding potential of tires. The following results were obtained with vulcanizates having the composition shown based on 100 parts of cis polybutadiene.

TABLE II

| | Control | 5 |
|---|---|---|
| Raw Mooney, ML-4 (212° F.) | 45 | 65 |
| Asphalt | | 23 |
| Polybutene | | 7 |
| Benzoic Acid | | 2.7 |
| Resultant ML-4 (212°) | 45 | 37 |
| Compound Mooney, ML-4 (212° F.) | 76 | 49 |
| 300% Modulus of sample used, p.s.i. | 1,100 | 1,080 |
| Percent rebound, room temperature | 62.5 | 51.5 |
| Percent rebound. 300° F | 65.7 | 71.2 |
| Ratio | 0.95 | 0.72 |

Rubbery compositions similar to those of Examples 2, 3, and 5 are prepared using, in place of the specified polybutene, the aforedescribed (i) polyterpene, (ii) butadiene-styrene, or (iii) polyethylene. Similar results are also obtained using such other acids as octanoic acid, and the naphthenic acids in the rubber compositions illustrated. Pneumatic tires prepared by a standard manufacturing process, from the rubbery compositions exemplified, have advantageous properties. They are tough, durable and have a satisfactory resiliency level.

Though the invention has been described with reference to only a limited number of examples it is to be understood that variants thereof may be produced without departing from its spirit or scope.

What is claimed is:
1. An easily processed rubbery composition comprising as the base component, 100 parts of cis 1,4-polybutadiene having at least 85% of the butadiene units joined cis-1,4, and
   (i) between 20 and 100 parts of asphalt,
   (ii) between 0.5 and 5 parts of a monocarboxylic acid selected from the group consisting of benzoic acid and aliphatic monocarboxylic acids having 6 to 10 carbon atoms, and
   (iii) between 3 and 15 parts of an hydrocarbon polymer selected from the group consisting of (a) copolymers of butadiene and styrene containing up to 25% styrene and having a molecular weight between 500 and 20,000 (b) polyterpenes having a ring and ball softening point between 10° C. and 125° C. and a specific gravity between 0.95 and 1.00, (c) polyethylenes having a melting point between 200° F. and 235° F., a specific gravity of approximately 0.92, and an average viscosity at 140° C. of between 100 and 4000 centipoises, and (d) polybutenes having a specific gravity at 60° F. of between 0.87 and 0.91, a pour point between 20 and 70° F., and a molecular weight between 500 and 20,000.

2. The composition of claim 1 containing between 1.5 and 3 parts of said acid, and between 5 and 10 parts of said hydrocarbon polymer.

3. The composition of claim 2 wherein said acid is selected from the group consisting of octanoic acid and naphthenic acid.

4. The composition of claim 2 wherein said acid is benzoic acid.

5. The composition of claim 4 wherein said hydrocarbon polymer is a polybutene.

6. A pneumatic tire having good resiliency made by vulcanizing a composition comprising as the base rubber polymer, cis 1,4-polybutadiene having at least 85% of the butadiene units joined cis 1,4, and
   (i) between 20 and 100 parts of asphalt,
   (ii) between 0.5 and 5 parts of a monocarboxylic acid selected from the group consisting of benzoic acid and aliphatic monocarboxylic acids having 6 to 10 carbon atoms, and
   (iii) between 3 and 15 parts of an hydrocarbon polymer selected from the group consisting of (a) copolymers of butadiene and styrene containing up to 25% styrene and having a molecular weight between 500 and 20,000, (b) polyterpenes having a ring and ball softening point between 10° C. and 125° C. and a specific gravity between 0.95 and 1.00, (c) polyethylenes having a melting point between 200° F. and 235° F., a specific gravity of approximately 0.92, and an average viscosity at 140° C. of between 100 and 4000 centipoises, and (d) polybutenes having a specific gravity at 60° F. of between 0.87 and 0.91, a pour point between 20 and 70° F., and a molecular weight between 500 and 20,000.

7. The pneumatic tire of claim 6 containing between 1.5 and 3 parts of said acid, and between 5 and 10 parts of said hydrocarbon polymer.

References Cited

UNITED STATES PATENTS

| | | | |
|---|---|---|---|
| 2,215,382 | 9/1940 | Warner | 260—753 |
| 2,582,264 | 1/1952 | McMillan et al. | 260—758 |
| 2,638,460 | 5/1953 | Crouch | 260—23.7 |
| 2,648,644 | 8/1953 | McMillan et al. | 260—758 |
| 3,060,989 | 10/1962 | Railsback et al. | 260—27 |
| 3,157,609 | 11/1964 | McNay et al. | 260—27 |
| 3,247,881 | 4/1966 | Barton et al. | 260—41.5 |
| 3,264,237 | 8/1966 | Sarbach et al. | 260—23.7 |
| 3,280,876 | 10/1966 | Snow | 152—330 |

FOREIGN PATENTS 881,428   11/1961   Great Britain.

OTHER REFERENCES

"Compounding Ingredients for Rubber," 1961, pages 217, 227, 228 and 255.

Renfrew et al.: "Polyethene," 1960, pages 299 and 300.

DONALD E. CZAJA, *Primary Examiner.*

LEON J. BERCOVITZ, *Examiner.*

R. A. WHITE, *Assistant Examiner.*